US011106457B1

(12) United States Patent
Subramanian et al.

(10) Patent No.: US 11,106,457 B1
(45) Date of Patent: Aug. 31, 2021

(54) UPDATING FIRMWARE RUNTIME COMPONENTS

(71) Applicant: AMERICAN MEGATRENDS INTERNATIONAL, LLC, Norcross, GA (US)

(72) Inventors: Senthamizhsey Subramanian, Suwanee, GA (US); Srinivasan N. Rao, Suwanee, GA (US); Feliks Polyudov, Suwanee, GA (US); Bejean David Mosher, Acworth, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 16/933,331

(22) Filed: Jul. 20, 2020

(51) Int. Cl.

| | |
|---|---|
| ***G06F 9/44*** | (2018.01) |
| ***G06F 8/656*** | (2018.01) |
| ***G06F 9/445*** | (2018.01) |
| *G06F 9/4401* | (2018.01) |

(52) U.S. Cl.
CPC .......... *G06F 8/656* (2018.02); *G06F 9/44594* (2013.01); *G06F 9/4401* (2013.01)

(58) Field of Classification Search
CPC .......................................................... G06F 9/44
See application file for complete search history.

(56) References Cited

U.S. PATENT DOCUMENTS 5,634,130 A * 5/1997 Lee ........................ G06F 9/4812 710/260
2009/0271772 A1* 10/2009 Stephenson ......... G06F 9/45516 717/145
2013/0086571 A1* 4/2013 Dasari ..................... G06F 8/654 717/168

* cited by examiner

*Primary Examiner* — Jae U Jeon
(74) *Attorney, Agent, or Firm* — Newport IP, LLC; Leonard J. Hope

(57) ABSTRACT

A computing device includes a processor, a volatile memory, and a non-volatile memory. The computing device receives a firmware update that includes updated firmware runtime components, such as updated runtime interrupt handlers (e.g. SMI handlers). The computing device stores the updated firmware runtime components in the volatile memory (e.g. RAM) of the device. The computing device also causes the updated firmware runtime components stored in the volatile memory to be used during the runtime of the computing device instead of one or more other firmware runtime components previously stored in the volatile memory. For example, the contents of one or more interrupt routing tables can be adjusted such that updated runtime interrupt handlers stored in volatile memory are used instead of previously installed and potentially insecure runtime interrupt handlers. On a subsequent reboot of the computing device, updated firmware runtime components stored in the non-volatile memory will be utilized.

20 Claims, 6 Drawing Sheets

UPDATING FIRMWARE RUNTIME COMPONENTS

BACKGROUND

Computing device firmware commonly executes in two phases: a boot time phase and a runtime phase. During the boot time phase, firmware performs various system initialization tasks, such as initializing hardware devices, and then boots an operating system. Once the boot time phase has completed, firmware proceeds to the runtime phase of execution.

During the runtime phase of execution, firmware can provide runtime services for performing various types of functionality. Runtime services are implemented using runtime interrupt handlers in some computing devices. For instance, computing devices having INTEL x86 architectures commonly utilize a System Management Mode ("SMM") through which system management interrupts ("SMIs") can be generated to access runtime functionality provided by SMI handlers. Other types of architectures can support the execution of firmware runtime components in other ways.

Firmware runtime components, such as SMI handlers, can include programming errors, or "bugs," that cause security vulnerabilities. In order to address security vulnerabilities in firmware runtime components it is commonly necessary to apply an update, or patch, to the firmware containing the firmware runtime component and to reboot the computing device.

In order to reduce the risk of security vulnerabilities in firmware runtime components, firmware updates should be immediately applied to affected computing devices. However, in many types of environments it might not be possible to immediately apply a firmware update to a computing device and restart the device. For example, it might not be possible to patch and immediately reboot computing devices in large-scale data centers that support critical processing operations, such as research, e-commerce, or other tasks that require maximum uptime.

It is with respect to these and other considerations that the disclosure made herein is presented.

SUMMARY

Technologies are described herein for updating firmware runtime components. Through implementations of the disclosed technologies, updated firmware runtime components can be stored in the volatile memory of a computing device and executed immediately without rebooting the device. As a result, patches to firmware runtime components can be utilized immediately, thereby immediately improving the security of the computing device, without requiring an immediate reboot of the computing device. The computing device can be rebooted at a future time to permanently apply the updates to the firmware runtime components in non-volatile memory. Technical benefits other than those specifically mentioned herein can also be realized through implementations of the disclosed technologies.

In order to provide the technical benefits mentioned above, and potentially others, a computing device is provided that includes one or more processors, a volatile memory, and a non-volatile memory. In one embodiment, the computing device is configured to receive a firmware update during runtime. For example, in one embodiment, an operating system executing on the device runs a runtime update application that is configured to retrieve the firmware update from an update server. The firmware update can include one or more updated firmware runtime components, such as updates to one or more updated runtime interrupt handlers (e.g. SMI handlers).

The computing device is also configured to store the one or more updated firmware runtime components in the volatile memory (e.g. RAM) of the device. For example, the runtime update application might provide the firmware update, including the updated firmware runtime components, to a runtime update listener component in the firmware. The runtime update listener component can store the firmware update in the non-volatile memory. The runtime update listener can also store the firmware update in the non-volatile memory (e.g. NVRAM).

The runtime update listener can also cause the one or more updated firmware runtime components stored in the volatile memory to be used during the runtime of the computing device instead of one or more other firmware runtime components previously stored in the volatile memory. For example, the runtime update listener might adjust the contents of one or more interrupt routing tables such that updated runtime interrupt handlers stored in non-volatile memory are used instead of previously installed and potentially insecure runtime interrupt handlers.

Once the updated firmware runtime components have been configured for use in volatile memory, the runtime update listener can unload the firmware runtime components previously stored in the volatile memory to save memory. On a subsequent reboot of the computing device, the updated firmware runtime components stored in the non-volatile memory as part of the firmware update will be utilized.

It should be appreciated that the above-described subject matter can also be implemented as a computer-controlled apparatus, a computer process, a computing device or device, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for updating firmware runtime components. As discussed briefly above, implementations of the disclosed technologies enable patches to firmware runtime components such as SMI handlers to be utilized immediately without requiring a reboot of the computing device. Technical benefits other than those specifically mentioned herein can also be realized through implementations of the disclosed technologies.

It is to be appreciated that the subject matter presented herein can be implemented as a computer process, a computer-controlled apparatus, a computing device, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings provided herewith are not drawn to scale. Like numerals represent like elements throughout the several figures (which might be referred to herein as a "FIG." or "FIGS.").

Figure 1:
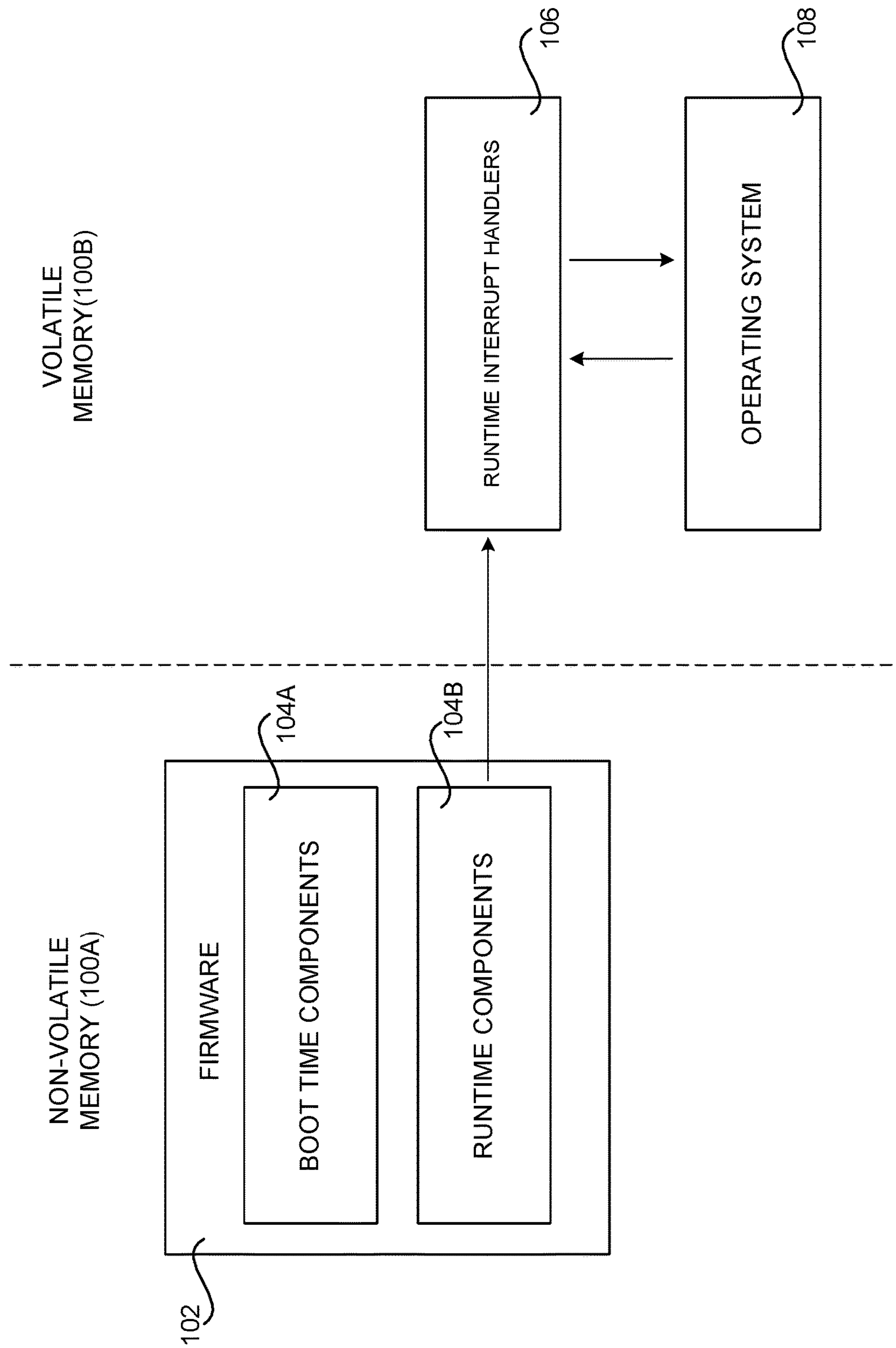
FIG. 1 is a software architecture diagram showing aspects of a computing device that forms an operating environment for the technologies disclosed herein, according to one embodiment disclosed herein.

FIG. 1 is a software architecture diagram showing aspects of a computing device that forms an illustrative operating environment for the technologies disclosed herein, according to one embodiment. As discussed briefly above, a computing device implementing the disclosed technologies can include one or more processors, a non-volatile memory 100A, and a volatile memory 100B. A firmware 102 can be stored in the non-volatile memory device 100A, such as a non-volatile random access memory ("NVRAM"). Portions of the firmware 102 can also be copied to and executed from the volatile memory 100B (e.g. RAM) for faster execution.

The firmware 102 executes in two phases: a boot time phase and a runtime phase. During the boot time phase of execution, boot time components 104A in the firmware 102 perform various system initialization tasks, such as initializing hardware components in the computing device. The firmware 102 then causes the computing device to boot an operating system 108. Once the boot time phase has completed, the firmware 102 proceeds to the runtime phase of execution.

During the runtime phase of execution, runtime components 104B of the firmware 102 are executed. The runtime components 104B can perform various types of functionality such as providing runtime services that can be used by the operating system 108 and application programs executing on the operating system 108. Runtime services are implemented using runtime interrupt handlers 106 in some computing devices. For instance, computing devices having INTEL x86 architectures commonly utilize a SMM through which SMIs can be generated by an operating system 108 to access runtime functionality provided by runtime interrupt handlers 106. Other types of architectures can support the execution of firmware runtime components in other ways.

As discussed briefly above, firmware runtime components 104B, such as SMI handlers, can include programming errors, or "bugs," that cause security vulnerabilities. In order to address security vulnerabilities in firmware runtime components 104B it is commonly necessary to apply a patch to the firmware 102 containing the affected firmware runtime component 104B and to reboot the computing device.

In order to reduce the risk of security vulnerabilities in firmware runtime components 104B, firmware updates should be immediately applied to affected computing devices. However, in many types of environments it might not be possible to immediately apply a firmware update to a computing device and restart the device. For example, it might not be possible to patch and immediately reboot computing devices in large-scale data centers that support critical processing operations, such as research, e-commerce, or other tasks that require maximum uptime.

In order to address the technical problem described above, and potentially others, a firmware 102 is disclosed herein that enables updated firmware runtime components 104B to be stored in the volatile memory 100B of a computing device and executed immediately without rebooting the device. As a result, updates to firmware runtime components 104B can be utilized immediately, thereby immediately improving the security of the computing device, without requiring an immediate reboot of the computing device. As will be discussed in greater detail below, the computing device can be rebooted at a future time to permanently apply the updates to the firmware runtime components 104B in non-volatile memory 100A. Additional details regarding these aspects will be provided below with regard to FIGS. 2A-3.

Figure 2A:
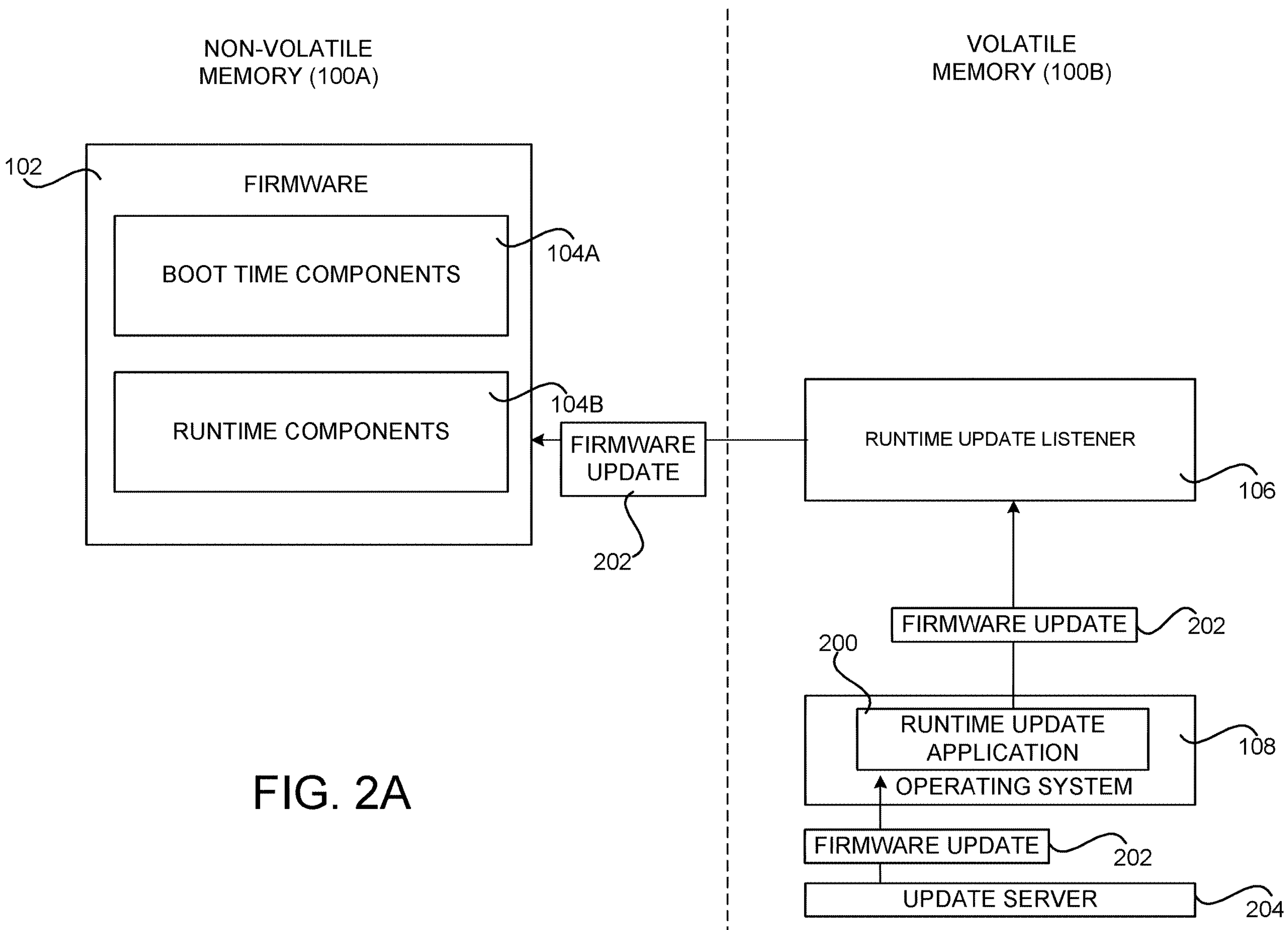
FIGS. 2A and 2B are software architecture diagram showing aspects of one mechanism disclosed herein for updating firmware runtime components, according to one embodiment disclosed herein.
Figure 2B:
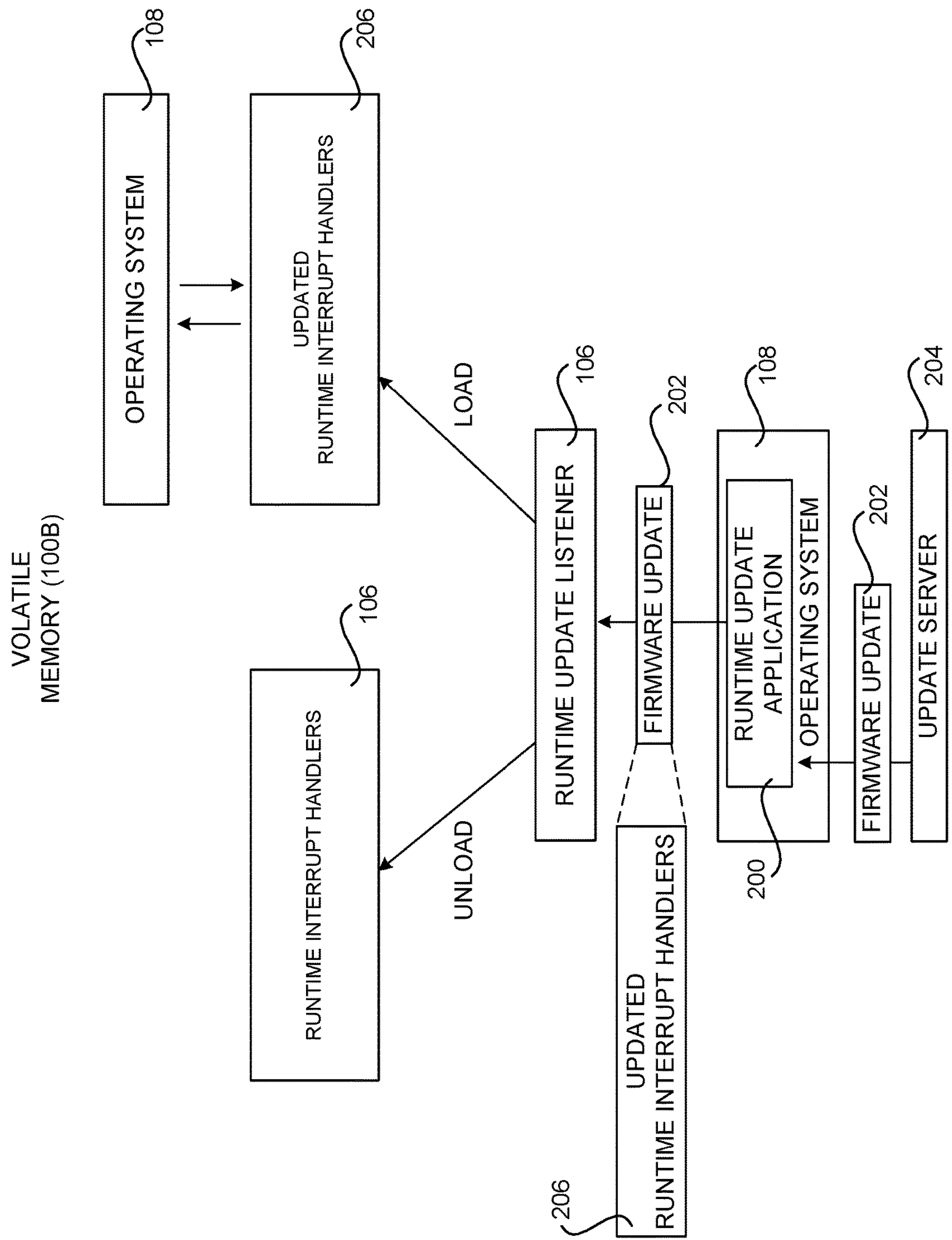

FIGS. 2A and 2B are software architecture diagram showing aspects of one mechanism disclosed herein for updating firmware runtime components 104B, according to one embodiment disclosed herein. As shown in FIG. 2A, a computing device implementing the disclosed technologies can receive a firmware update 202 during runtime and apply the update to the firmware 102 stored in non-volatile memory 100A. The firmware update 202 can include one or more updated firmware runtime components 104B, such as updates to one or more updated runtime interrupt handlers 206 (shown in FIG. 2B) (e.g. SMI handlers). The firmware update 202 can also include updates to other components in the firmware 102, such as the boot time components 104A.

In the configuration shown in FIG. 2A, an operating system 108 executing on the computing device executes a runtime update application 200 that is configured to retrieve the firmware update 202 from a network-accessible update server 204. The runtime update application 200 can obtain the firmware update 202 in other ways in other configurations.

In order to update the firmware 102 with the firmware update 202, the runtime update application 200 can call a runtime update listener 106 provided by the firmware 102. The runtime update listener 106 itself can implement one or more runtime interrupt handlers in order to enable communication with the runtime update application 200. Through this interface, the runtime update application 200 can provide the firmware update 202 to the runtime update listener 106.

The runtime update listener 106 can, in turn, store the firmware update 202 in non-volatile memory 100A in order to update the runtime components 104B. Updates to the firmware 102 stored in non-volatile memory 100A are not, however, executed until the next reboot of the computing device. As discussed above, the disclosed technologies enable updating of the runtime components 104B without immediately rebooting the computing device. This process is illustrated in FIGS. 2B and 3.

As shown in FIG. 2B, the runtime update listener 106 can also store updated firmware runtime components 104B like the updated runtime interrupt handlers 206 in volatile memory 100B. The runtime update listener 106 can also cause the one or more updated firmware runtime components 104B stored in the volatile memory 100B to be used during the runtime of the computing device instead of one or more other firmware runtime components previously stored in the volatile memory 100B. For example, the runtime update listener 106 might adjust the contents of one or more interrupt routing tables such that updated runtime interrupt handlers 206 stored in volatile memory 100B are used instead of previously installed and potentially insecure runtime interrupt handlers 106.

Once the updated firmware runtime components 104B have been configured for use in volatile memory 100B, the runtime update listener 106 can unload the firmware runtime components (e.g. the runtime interrupt handlers 106 shown in FIG. 2B) previously stored in the volatile memory 100B to save memory. On a subsequent reboot of the computing device, the updated firmware runtime components 104B stored in the non-volatile memory 100A as part of the firmware update will be utilized.

Figure 3:
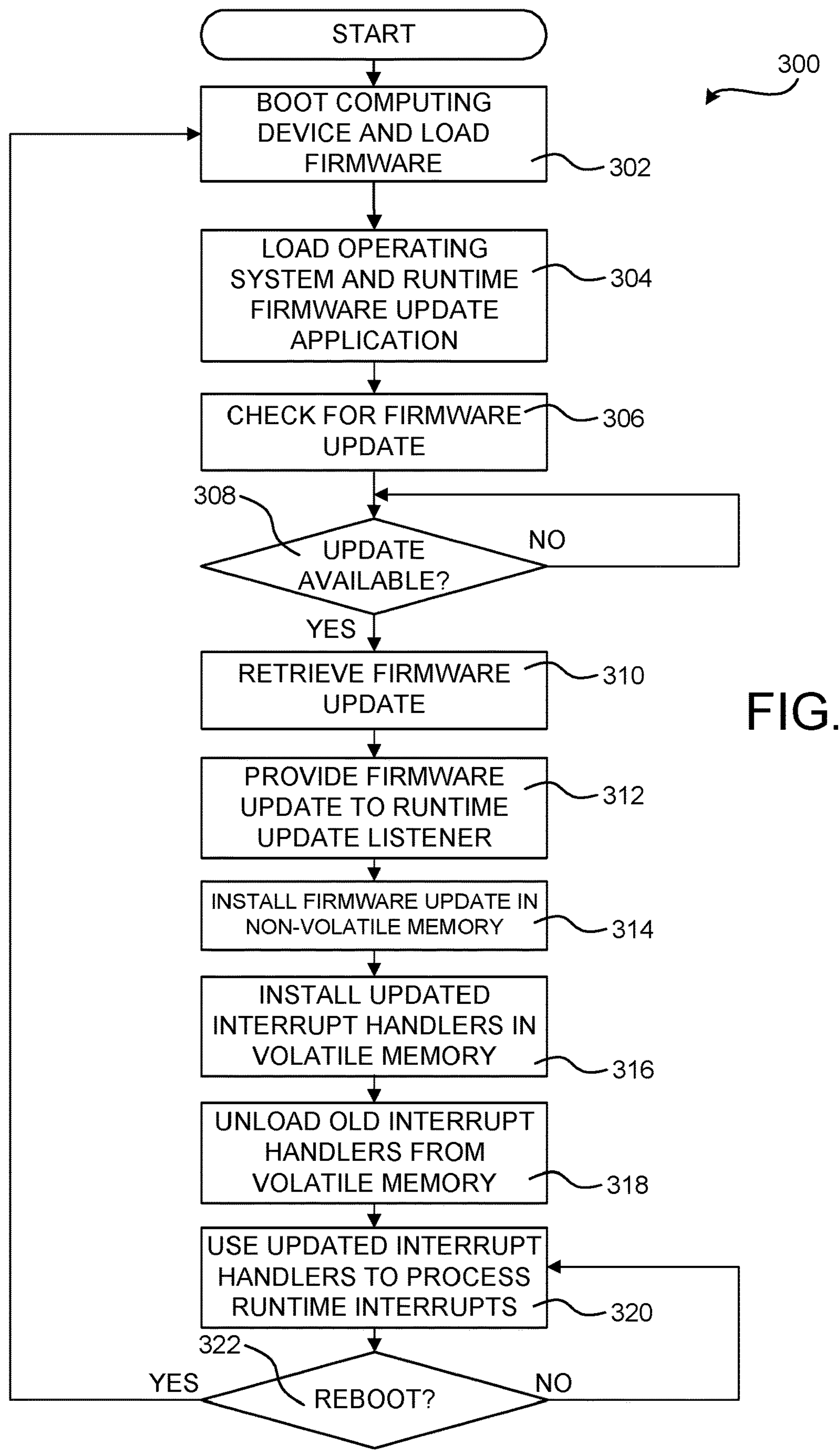
FIG. 3 is a flow diagram showing a routing that illustrates aspects of the mechanism disclosed herein for updating firmware runtime components, according to one embodiment disclosed herein.

FIG. 3 is a flow diagram showing a routine 300 that illustrates aspects of the mechanism disclosed herein for updating firmware runtime components, according to one embodiment disclosed herein. It is to be appreciated that the logical operations described herein with respect to FIG. 3 and the other FIGS., can be implemented (1) as a sequence of computer implemented acts or program modules running on a computing device and/or (2) as interconnected machine logic circuits or circuit modules within the computing device.

The implementation of the various components described herein is a matter of choice dependent on the performance and other requirements of the computing device. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 300 begins at operation 302, where a computing device is booted and firmware 102 is loaded from a non-volatile memory 100A. One illustrative architecture for a computing device capable of implementing the disclosed technologies is described below with regard to FIG. 5.

From operation 302, the routine 300 proceeds to operation 304 where the computing device begins executing an operating system 108 and the runtime update application 200. The routine 300 then proceeds to operation 306, where the runtime update application 200 communicates with the update server 204 to determine if a firmware update 202 is available for the computing device. If a firmware update 202 is available, the routine 300 proceeds from operation 308 to operation 310, where the runtime update application 200 retrieves the firmware update 202 from the update server 204.

From operation 310, the routine 300 proceeds to operation 312, where the runtime update application 200 provides the firmware update 202 to the runtime update listener 106. As discussed above, the runtime update listener 106 is a part of the firmware 102 that can communicate with the runtime update application 200. The runtime update listener 106 can implement runtime interrupt handlers to enable this communication.

From operation 312, the routine 300 proceeds to operation 314, where the runtime update listener 106 updates the content of non-volatile memory 100A with the firmware update 202. This can include, for instance, updating boot time components 104A, runtime components 104B, or other firmware components stored in the non-volatile memory 100A. This process is illustrated in FIG. 2A.

From operation 314, the routine 300 proceeds to operation 316, where the runtime update listener 106 stores updated runtime interrupt handlers 206 from the firmware update 202 in volatile memory 100B. The runtime update listener 106 also causes the updated runtime interrupt handlers 206 stored in the volatile memory 100B to be used during the runtime of the computing device instead of one or more other runtime interrupt handlers 106 previously stored in the volatile memory 100B (e.g. at the previous boot time of the computing device). For example, and as described briefly above, the runtime update listener 106 might adjust the contents of one or more interrupt routing tables such that updated runtime interrupt handlers 206 stored in volatile memory 100B are used instead of previously installed and potentially insecure runtime interrupt handlers 106. The runtime update listener 106 can also unload the runtime interrupt handlers 106 previously stored in the volatile memory 100B to save memory. This process is shown in FIG. 2B.

From operation 318, the routine 300 proceeds to operation 320, where the updated runtime interrupt handlers 206 are utilized to process runtime interrupts, such as SMI interrupts. The routine 300 then proceeds from 320 to operation 322, where a determination is made as to whether the computing device has been rebooted. If the device has been rebooted, the routine 300 proceeds from operation 322, where the process described above can be repeated. On a subsequent reboot of the computing device, the updated firmware runtime components 104B stored in the non-volatile memory 100A as part of the update process described above will be utilized.

Figure 4:
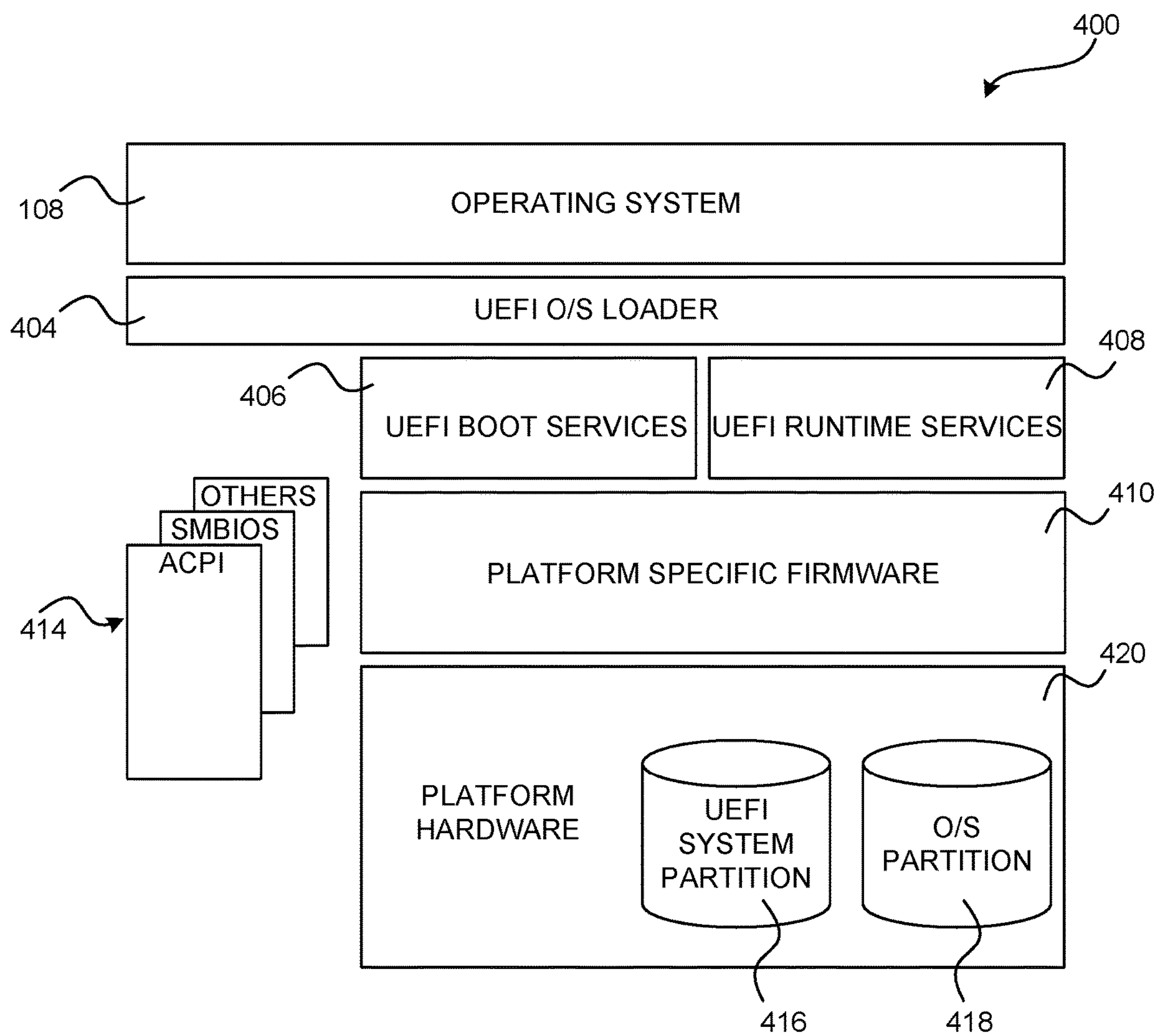
FIG. 4 is a software architecture diagram illustrating a software architecture for a UEFI-compliant firmware that provides an operating environment for aspects of the technologies presented herein in one embodiment.

Turning now to FIG. 4, a software architecture diagram will be described that illustrates an architecture 400 for a UEFI Specification-compliant firmware that can be configured to provide and/or utilize aspects of the technologies disclosed herein. In particular, the firmware architecture 400 shown in FIG. 4 can be utilized to implement the firmware 102 described above. The firmware 102 can also be implemented in conjunction with other firmware architectures in other configurations.

The UEFI Specification describes an interface between an operating system 108 and a UEFI Specification-compliant firmware 102. The UEFI Specification also defines an interface that a firmware 102 can implement, and an interface that an operating system ("OS") 108 can use while booting. How a firmware implements the interface can be left up to the manufacturer of the firmware. The UEFI Specification also defines a way for an operating system 108 and a firmware 102 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 4, the architecture can include platform hardware 420, such as that described below with regard to FIG. 5, an operating system 108, and a UEFI system partition 416. The UEFI system partition 416 can be an architecturally shareable system partition. As such, the UEFI system partition 416 can define a partition and file system designed to support safe sharing of mass storage between multiple vendors. An OS partition 418 can also be utilized.

Once started, the UEFI OS loader 404 can continue to boot the complete operating system 108. In doing so, the UEFI OS loader 404 can use UEFI boot services 406, UEFI runtime services 408, and an interface to other supported specifications, to survey, comprehend, and initialize the various platform components and the operating system software that manages them. Thus, interfaces 414 from other specifications can also be present on the system. For example, ACPI and the System Management BIOS ("SMBIOS") specifications can be supported.

UEFI boot services 406 can provide interfaces for devices and system functionality used during boot time. UEFI runtime services 408 can also be available to the UEFI OS loader 404 during the boot phase. UEFI allows extension of platform firmware by loading UEFI driver and UEFI application images which, when loaded, have access to UEFI-defined runtime and boot services such as those described above.

Additional details regarding the operation and architecture of a UEFI Specification-compliant firmware can be found in the UEFI Specification, which is available from the UEFI Forum. The UEFI Forum has also provided further details regarding recommended implementation of UEFI in the form of the Platform Initialization ("PI") Specification. Unlike the UEFI Specification, which focuses on programmatic interfaces for the interactions between the operating system 108 and system firmware 102, the PI specification describes a firmware implementation that has been designed to perform the full range of operations that are required to initialize a platform from power on through transfer of control to the operating system 108. The PI specification, which is available from UEFI Forum, is also expressly incorporated herein by reference.

Figure 5:
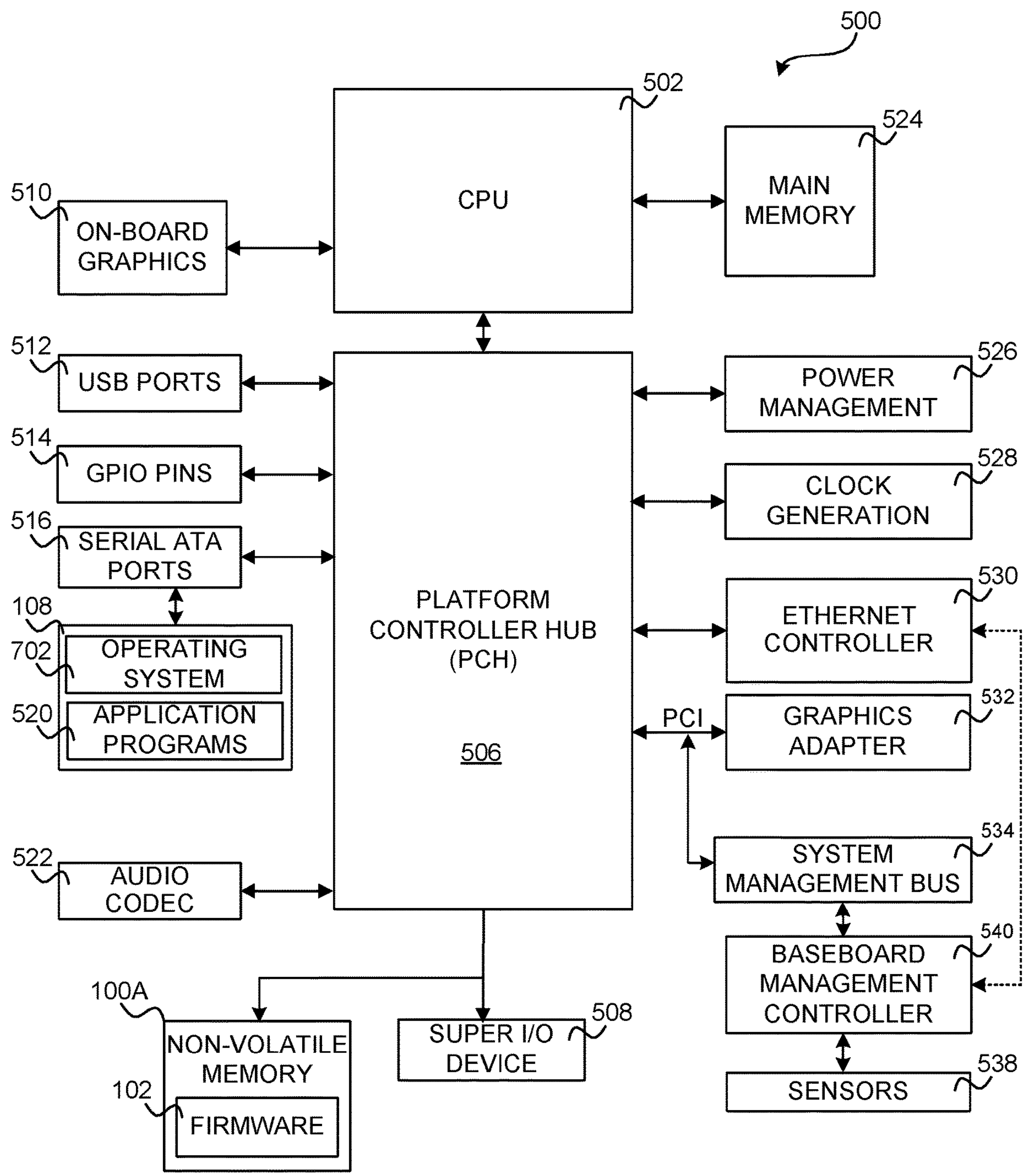
FIG. 5 is a computer architecture diagram that shows an illustrative architecture for a computer that can implement the technologies disclosed herein.

Referring now to FIG. 5, a computer architecture diagram that shows an illustrative architecture for a computer that can provide an operating environment for the technologies presented herein will be described. For example, and without limitation, the computer architecture shown in FIG. 5 can be utilized to implement a computing device 500 that executes the firmware 102, including the functionality described herein.

FIG. 5 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 5 shows an illustrative computer architecture for a computer 500 that can implement the technologies described herein. The illustrative computer architecture shown in FIG. 5 includes a baseboard, or "motherboard", which is a printed circuit board to which a multitude of components or devices can be connected by way of a system bus or other electrical communication path. In one illustrative configuration, a central processing unit ("CPU" or "processor") 502 operates in conjunction with a Platform Controller Hub ("PCH") 506. The CPU 502 is a central processor that performs arithmetic and logical operations necessary for the operation of the computer 500. The computer 500 can include a multitude of CPUs 502. Each CPU 502 might include multiple processing cores.

The CPU 502 provides an interface to a RAM or other type of volatile memory device used as the main memory 524 in the computer 500 and, possibly, to an on-board graphics adapter 510. The PCH 506 provides an interface between the CPU 502 and the remainder of the computer 500.

The PCH 506 can also be responsible for controlling many of the input/output functions of the computer 500. In particular, the PCH 506 can provide one or more universal serial bus ("USB") ports 512, an audio codec 522, an Ethernet Controller 530, and one or more general purpose input/output ("GPIO") pins 514. The USB ports 512 can include USB 2.0 ports, USB 3.0 ports and USB 3.1 ports among other USB ports.

The PCH 506 can also include functionality for providing networking functionality through an Ethernet Controller 530. The Ethernet Controller 530 is capable of connecting the computer 500 to another computer via a network. Connections that can be made by the Ethernet Controller 530 can include LAN or WAN connections. LAN and WAN networking environments are commonplace in offices, enterprise-wide computer networks, intranets, and the Internet.

The PCH 506 can also provide a bus for interfacing peripheral card devices such as a graphics adapter 532. In one configuration, the bus comprises a PCI bus. The PCI bus can include a Peripheral Component Interconnect ("PCI")

bus, a Peripheral Component Interconnect eXtended ("PCI-X") bus and a Peripheral Component Interconnect Express ("PCIe") bus among others.

The PCH 506 can also provide a system management bus 534 for use in managing the various components of the computer 500. Additional details regarding the operation of the system management bus 534 and its connected components are provided below. Power management circuitry 526 and clock generation circuitry 528 can also be utilized during the operation of the PCH 506.

The PCH 506 is also configured to provide one or more interfaces for connecting mass storage devices to the computer 500. For instance, according to one configuration, the PCH 506 includes a serial advanced technology attachment ("SATA") adapter for providing one or more serial ATA ports 516. The serial ATA ports 516 can be connected to one or more mass storage devices storing an operating system and applications 220, such as a SATA disk drive 518. As known to those skilled in the art, an OS comprises a set of programs that control operations of a computer and allocation of resources. An application 220 is software that runs on top of the operating system, or other runtime environment, and uses computer resources to perform application specific tasks desired by the user, such as those described herein.

According to one configuration, the OS comprises the LINUX operating system. According to another configuration, the OS comprises the WINDOWS operating system from MICROSOFT CORPORATION. According to another configuration, the OS comprises the UNIX operating system or one of its variants. It should be appreciated that other operating systems can also be utilized.

The mass storage devices connected to the PCH 506, and their associated computer-readable storage media, provide non-volatile storage for the computer 500. Although the description of computer-readable storage media contained herein refers to a mass storage device, such as a hard disk or CD-ROM drive, it should be appreciated by those skilled in the art that computer-readable storage media can be any available media that can be accessed by the computer 500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 500.

A low pin count ("LPC") interface can also be provided by the PCH 506 for connecting a Super I/O device 508. The Super I/O device 508 is responsible for providing a number of input/output ports, including a keyboard port, a mouse port, a serial interface, a parallel port, and other types of input/output ports. The LPC interface can also connect a computer storage media such as a ROM or a flash memory such as a non-volatile memory 100A for storing firmware 102 that includes program code containing the basic routines that help to start up the computer 500 and to transfer information between elements within the computer 500 as discussed above.

It should be appreciated that the program modules disclosed herein, including the firmware 102, can include software instructions that, when loaded into the CPU 502 and executed, transform a general-purpose computer 500 into a special-purpose computer 500 customized to facilitate all, or part of, the operations disclosed herein. As detailed throughout this description, the program modules can provide various tools or techniques by which the computer 500 can participate within the overall systems or operating environments using the components, logic flows, and/or data structures discussed herein.

The CPU 502 can be constructed from any number of transistors or other circuit elements, which can individually or collectively assume any number of states. More specifically, the CPU 502 can operate as a state machine or finite-state machine. Such a machine can be transformed to a second machine, or a specific machine, by loading executable instructions contained within the program modules. These computer-executable instructions can transform the CPU 502 by specifying how the CPU 502 transitions between states, thereby transforming the transistors or other circuit elements constituting the CPU 502 from a first machine to a second machine, wherein the second machine can be specifically configured to perform the operations disclosed herein. The states of either machine can also be transformed by receiving input from one or more user input devices, network interfaces (such as the Gigabit Ethernet Controller 530), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 524 and/or non-volatile memory 100A. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 506 can include a system management bus 534. The system management bus 534 can include a baseboard management controller ("BMC") 540. The BMC 540 is a microcontroller that monitors operation of the computer 500. The BMC 540 monitors health-related aspects associated with the computer 500, such as, but not limited to, the temperature of one or more components of the computer 500, speed of rotational components (e.g., spindle motor, CPU fan, etc.) within the computer 500, the voltage across or applied to one or more components within the computer 500, and the available and/or used capacity of memory devices within the computer 500. To accomplish these monitoring functions, the BMC 540 is communicatively connected to one or more components by way of the system management bus 534 in some configurations.

In one configuration, these components include sensor devices 538 for measuring various operating and performance-related parameters within the computer 500. The sensor devices 538 can be either hardware or software based components configured or programmed to measure or detect one or more of the various operating and performance-related parameters.

The BMC 540 functions as the master on the system management bus 534 in most circumstances but can also function as either a master or a slave in other circumstances. Each of the various components communicatively connected to the BMC 540 by way of the system management bus 534 is addressed using a slave address. The system management bus 534 is used by the BMC 540 to request and/or receive various operating and performance-related parameters from one or more components, such as the firmware 102, which are also communicatively connected to the system management bus 534.

It should be appreciated that the functionality provided by the computer 500 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 500 might not include all the components shown in FIG. 5, can include other components that are not explicitly shown in FIG. 5, or might utilize an architecture completely different than that shown in FIG. 5.

Based on the foregoing, it should be appreciated that technologies for updating firmware runtime components such as SMI handlers have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computing device, comprising:

one or more processors;

a volatile memory; and a non-volatile memory having computer-executable instructions stored therein which, when executed by the one or more processors, cause the computing device to:

receive a firmware update during a runtime of the computing device, the firmware update comprising one or more updated runtime interrupt handlers, store the firmware update in the non-volatile memory, store the one or more updated runtime interrupt handlers in the volatile memory, and cause the one or more updated runtime interrupt handlers stored in the volatile memory to be used during the runtime of the computing device instead of one or more other runtime interrupt handlers previously stored in the volatile memory.

2. The computing device of claim 1, wherein the non-volatile memory has further computer-executable instructions stored therein to unload the one or more other runtime interrupt handlers previously stored in the volatile memory.

3. The computing device of claim 1, wherein the one or more updated runtime interrupt handlers and the one or more other runtime interrupt handlers previously stored in the volatile memory comprise system management interrupt (SMI) handlers.

4. The computing device of claim 1, wherein the computing device is configured to execute the firmware update from the non-volatile memory following a reboot of the computing device.

5. The computing device of claim 1, wherein the volatile memory stores an operating system and a runtime update application configured execute on the operating system and to retrieve the firmware update from an update server.

6. The computing device of claim 5, wherein the volatile memory stores a runtime update listener configured to receive the firmware update from the runtime update application.

7. The computing device of claim 6, wherein the runtime update listener is further configured to store the one or more updated runtime interrupt handlers in the volatile memory and to cause the one or more updated runtime interrupt handlers stored in the volatile memory to be used during the runtime of the computing device instead of one or more other runtime interrupt handlers previously stored in the volatile memory.

8. A non-transitory computer-readable storage medium having computer-executable instructions stored thereupon which, when executed by a computing device, cause the computing device to:

receive a firmware update during a runtime of the computing device, the firmware update comprising one or more updated runtime interrupt handlers;

store the firmware update in a non-volatile memory;

store the one or more updated runtime interrupt handlers in a volatile memory; and cause the one or more updated runtime interrupt handlers stored in the volatile memory to be used during the runtime of the computing device instead of one or more other runtime interrupt handlers previously stored in the volatile memory.

9. The non-transitory computer-readable storage medium of claim 8, having further computer-executable instructions stored therein to unload the one or more other runtime interrupt handlers previously stored in the volatile memory.

10. The non-transitory computer-readable storage medium of claim 8, wherein the one or more updated runtime interrupt handlers and the one or more other runtime interrupt handlers previously stored in the volatile memory comprise system management interrupt (SMI) handlers.

11. The non-transitory computer-readable storage medium of claim 8, wherein the computing device is configured to execute the firmware update from the non-volatile memory following a reboot of the computing device.

12. The non-transitory computer-readable storage medium of claim 8, wherein the volatile memory stores an operating system and a runtime update application configured execute on the operating system and to retrieve the firmware update from an update server.

13. The non-transitory computer-readable storage medium of claim 12, wherein the volatile memory further stores a runtime update listener configured to receive the firmware update from the runtime update application.

14. The non-transitory computer-readable storage medium of claim 13, wherein the runtime update listener is further configured to store the one or more updated runtime interrupt handlers in the volatile memory and to cause the one or more updated runtime interrupt handlers stored in the volatile memory to be used during the runtime of the computing device instead of one or more other runtime interrupt handlers previously stored in the volatile memory.

15. A computer-implemented method performed by a computing device, the method comprising:

receiving a firmware update during a runtime of the computing device, the firmware update comprising one or more updated runtime interrupt handlers;

storing the firmware update in a non-volatile memory of the computing device;

storing the one or more updated runtime interrupt handlers in a volatile memory of the computing device; and causing the one or more updated runtime interrupt handlers stored in the volatile memory to be used during the runtime of the computing device instead of one or more other runtime interrupt handlers previously stored in the volatile memory.

16. The computer-implemented method of claim 15, further comprising unloading the one or more other runtime interrupt handlers previously stored in the volatile memory.

17. The computer-implemented method of claim 15, wherein the one or more updated runtime interrupt handlers and the one or more other runtime interrupt handlers previously stored in the volatile memory comprise system management interrupt (SMI) handlers.

18. The computer-implemented method of claim 15, wherein the computing device is configured to execute the firmware update from the non-volatile memory following a reboot of the computing device.

19. The computer-implemented method of claim 15, wherein the volatile memory stores an operating system and a runtime update application configured execute on the operating system and to retrieve the firmware update from an update server.

20. The computer-implemented method of claim 19, wherein the volatile memory further stores a runtime update listener configured to receive the firmware update from the runtime update application, store the one or more updated runtime interrupt handlers in the volatile memory, and cause the one or more updated runtime interrupt handlers stored in the volatile memory to be used during the runtime of the computing device instead of one or more other runtime interrupt handlers previously stored in the volatile memory.

* * * * *